United States Patent [19]

Tachi et al.

[11] Patent Number: 4,925,825

[45] Date of Patent: May 15, 1990

[54] CATALYST FOR REMOVING NITROGEN OXIDES

[75] Inventors: Takahiro Tachi; Akira Kato; Hiroshi Kawagoshi; Hisao Yamashita; Tomoichi Kamo, all of Hitachi, Japan

[73] Assignee: Babcock-Hitachi Kabushiki Kaisha, Tokyo, Japan

[21] Appl. No.: 282,330

[22] Filed: Dec. 9, 1988

[30] Foreign Application Priority Data

Dec. 28, 1987 [JP] Japan .................................. 62-336182

[51] Int. Cl.$^5$ .................... B01J 21/06; B01J 23/22; B01J 23/28; B01J 23/34
[52] U.S. Cl. ...................................... 502/309; 502/324
[58] Field of Search ........................ 502/312, 324, 309

[56] References Cited

U.S. PATENT DOCUMENTS

| 3,856,881 | 12/1974 | Manning | 502/324 X |
| 4,003,854 | 1/1977 | Skvortsov et al. | 502/324 |
| 4,071,601 | 1/1978 | Shiraishi et al. | 502/312 X |
| 4,085,193 | 4/1978 | Nakajima et al. | 502/309 X |
| 4,113,660 | 9/1978 | Abe et al. | 502/350 X |

FOREIGN PATENT DOCUMENTS 51-52363  5/1976  Japan ............................. 423/239 A

OTHER PUBLICATIONS

H. A. Eick and L. Kihlborg, "The Crystal Structure of VOMoO$_4$", Acta Chemica Scandanavia 20 (1966), 722-729.

Primary Examiner—W. J. Shine
Attorney, Agent, or Firm—Fay, Sharpe, Beall, Fagan, Minnich & McKee

[57] ABSTRACT

A process for removing nitrogen oxides from exhaust gases containing volatile metal compound by the use of a catalyst the activity of which is hardly reduced by the volatile metal compound and a catalyst for the process are provided, which process comprises contacting the exhaust gases with a catalyst comprising TiO$_2$ and a composite oxide of vanadium and molybdenum and/or a composite oxide of vanadium and manganese in the presence of ammonia.

8 Claims, No Drawings

CATALYST FOR REMOVING NITROGEN OXIDES

BACKGROUND OF THE INVENTION

1. Field of the Invention

This invention relates to a process for removing nitrogen oxides and a catalyst therefor. More particularly, it relates to a process for removing nitrogen oxides according to which the activity of the catalyst is not easily reduced due to volatile metal compounds and the removal is carried out efficiently, and a catalyst therefor.

2. Description of the Related Art

The process of removing nitrogen oxides ($NO_x$) contained in various exhaust gases by reducing them with ammonia ($NH_3$) has been becoming a main current of denitration process for exhaust gases generated from various fixed sources including boiler combustion gases, since the afore-mentioned process is simple and efficient. The process requires the so-called denitration catalyst for promoting the reaction of $NO_x$ with $NH_3$, and various inventions therefor have so far been made. Among such catalysts, those which have currently been practically used are catalysts represented by those disclosed in Japanese patent application laid-open Nos. Sho 50-51966/1975 and Sho 52-122293/1977, i.e. those obtained by adding oxides of vanadium (V), molybdenum (Mo), tungsten (W), iron (F), etc. to titanium oxide ($TiO_2$) as a main component. These catalysts, even when sulfur oxides are contained in exhaust gases, are not deteriorated easily and exhibit a high denitration performance; hence they are superior catalysts.

However, it has been known that even these catalysts may cause reduction in the denitration performance depending on kinds of catalysts. When volatile metal compounds, particularly oxides of selenium, tellurium, thallium, arsenic, etc. are contained in exhaust gases, there has been raised a problem that the performance of the above-mentioned catalysts is reduced. Further, necessity of catalysts having a higher activity than those of conventional catalysts has been increasing.

An example of denitration catalysts having oxides of vanadium and other metals combined with titanium oxide is disclosed in Japanese patent publication No. Sho 53-28148/1978. However, this catalyst contains a mere mixture of oxide of vanadium and oxide of molybdenum or mixed oxides wherein a certain solid solution is partly formed, but the catalyst contains no composite oxide of vanadium and molybdenum.

SUMMARY OF THE INVENTION

The object of the present invention is to provde a process for removing nitrogen oxides by the use of a catalyst having a catalyst activity which is difficultly deteriorated by volatile metal compounds contained in exhaust gases.

The present invention resides in;

a process for removing nitrogen oxides from exhaust gases containing nitrogen oxides which process comprises contacting the exhaust gases with a catalyst comprising titanium oxide and at least one compound selected from a composite oxide of vanadium and molybdenum and a composite oxide of vanadium and manganese in the presence of ammonia.

DETAILED DESCRIPTION OF PREFERRED EMBODIMENTS

In the process of the present invention, a catalyst having a high denitration performance and hardly deteriorated by volatile metal compounds is used. The catalyst is characterized by containing titanium oxide as a first component and at least one member of a composite oxide of vanadium and molybdenum and a composite oxide of vanadium and manganese as a second component. It has been found that the catalyst of the present invention containing titanium oxide and a composite oxide of vanadium and molybdenum has a far less reduction in the activity due to volatile metal compounds as compared with conventional catalysts obtained by mixing titanium oxide with molybdenum oxide or by mixing titanium oxide with vanadium oxide. Further, it has also been found that the catalyst of the present invention has a less reduction in the activity even as compared with a catalyst obtained by merely mixing titanium oxide with molybdenum oxide and vanadium oxide. Still further, it has also been found that even in the case of a catalyst using a composite oxide of vanadium and manganese in place of a composite oxide of vanadium and molybdenum, reduction in the activity is similarly improved.

The reason that the above-mentioned composite oxides exhibit particularly an inhibition effect upon the activity reduction due to volatile metal compounds has not yet been clarified, but it is considered that when vanadium and molybdenum or manganese form a composite oxide, chemical properties different from those of the respective single oxides are developed, whereby the resulting catalyst is hard to be poisoned by volatile metal compounds. For example, it is considered that when the composite oxides are formed, the arrangement of vanadium and molybdenum or manganese is determined by their crystalline structures and the dispersion state thereof on the catalyst surface is changed from those in the case of single oxides so that the resulting catalyst is hard to be poisoned. Further, it is also considered that when the composite oxides are formed, the valence states of vanadium, molybdenum and manganese are changed so that the resulting catalyst is difficulty poisoned.

The composite oxide of vanadium and molybdenum used in the present invention is expressed by the formula $MoV_xO_y$; x is in the range of 0.5 to 3 and y is in the range of 3 to 10; and as representative compounds, $VOMoO_4$, $Mo_4V_6O_{25}$, $Mo_6V_9O_{40}$, $Mo_{V2}O_8$, $MoVO_5$, etc. are exemplified. Further, the composite oxide of vanadium and manganese used in the present invention is expressed by the formula $Mn_aV_bO_c$; a is in the range of 1 to 4, b is in the range of 1 to 2 and c is in the range of 3 to 9; and $MnVO_5$, $MnV_2O_6$, $Mn_2V_2O_4$, $Mn_2V_2O_7$, $Mn_4V_2O_9$, $Mn_3(VO_4)_2$, etc. are exemplified. These compounds are different in the structure from mere mixtures of vanadium oxide with molybdenum oxide or manganese oxide, and can be distinguished therefrom by means of X-ray diffraction analysis, infrared spectrophotometric analysis, X-ray photoelectric spectra (XPS), extended-X-ray absorption end fine structure analysis (EXAFS), etc. When these compounds are used as a catalyst component, it is possible to prepare a catalyst having vanadium with molybdenum or manganese in a different dispersion state.

The content of the composite oxides of vanadium with molybdenum and/or vanadium with manganese is preferably 1 to 50% by weight, more preferably 2 to 20% by weight. If the content is too low, the catalyst activity is low and hence the catalyst is not practical, while if it is too high, the oxidation decomposition of $NH_3$ added as a reducing agent for $NO_x$ is increased so that $NO_x$-removing performance particularly at 400° C. or higher is reduced.

The composite oxides used in the process of the present invention can be obtained by mixing a salt of molybdenum or manganese with a salt of vanadium or mixing oxides or hydroxides of these, followed by calcining such mixture at 500° to 1,000° C. Examples of salts of molybdenum, manganese or vanadium are ammonium salts, carbonates, nitrates and chlorides thereof. Further, as the calcination atmosphere, reducing atmosphere is preferred. For example, when nitrogen atmosphere is used, it is possible to obtain composite oxides of various compositions. For identifying the composition of the resulting composite oxides, X-ray diffraction analysis may be employed.

The catalyst used in the process of the present invention is necessary to contain at least titanium oxide. When a composite oxide of vanadium and molybdenum and/or manganese is combined with titanium oxide, it is possible to obtain a catalyst having a high activity and a high endurability. Besides these components, it is also possible to add various components exhibiting an activity for the denitration reaction such as oxides and/or sulfates of W, Fe, Cr, Ce, Cu, Ni, etc. Further, in order to improve the catalyst performances such as strength, various additives such as $SiO_2$, $Al_2O_3$, etc. may also be added.

As to the catalyst shape, various ones such as pellet, spherical, cylinderical, honeycomb, plate shape or the like may be used. Further, it is also possible to use materials obtained by coating the catalyst on metal substrate, ceramic substrate, honeybomb ceramics, etc.

As to the process for preparing the catalyst, the method of carrying the active components on the substrates has no particular limitation and any of conventional immersion method, kneading method, precipitation method, etc. may be employed.

The temperature at which the nitration reaction is carried out using the catalyst for the process of the present invention is preferably in the range of 150° to 600° C., more particularly 200° to 550° C. If the temperature is too low, no sufficient denitration performance is obtained, while if it is too high, the oxidation activity of $NH_3$ added as a reducing agent for $NO_x$ becomes high so that the denitration activity is reduced.

The present invention will be described in more detail by way of Examples.

EXAMPLE 1

A catalyst used in the process of the present invention was prepared as follows:

Distilled water (50 ml) was added to $MoO_3$ powder (14 g) and $V_2O_4$ powder (8 g), followed by sufficiently kneading the mixture by means of a mixing and grinding machine for one hour and calcining the resulting slurry in nitrogen atmosphere at 700° C. for 2 hours. The resulting oxide was examined by means of X-ray diffraction. As a result, it was in the form of $MoVO_5$. A metatitanic acid slurry (the content of the acid in terms of $TiO_2$: 30% by weight) (100 g) was mixed with the above obtained composite oxide (3.3 g), followed by sufficiently kneading the mixture by means of a mixing and grinding machine, drying the resulting material at 150° C., adding 1% by weight of graphite, molding the mixture into tablets of 6 mm in diameter and 6 mm high, and calcining the resulting molded product in nitrogen atmosphere at 450° C. for 2 hours to obtain Example catalyst 1. This catalyst contained $MoVO_5$ in 10% by weight. In the performance test of this catalyst, particles of a particle size of 10 to 20 meshes obtained by grinding the above-mentioned molded product were used.

EXAMPLES 2-4

Example 1 was repeated except that the content of $MoVO_5$ was varied to 1% by weight, 20% by weight and 50% by weight, to obtain Example catalysts 2, 3 and 4.

COMPARATIVE EXAMPLE 1

A metatitanic acid slurry (100 g) was mixed with $MoO_3$ powder (3.3 g), followed by sufficiently kneading the mixture, drying the resulting material at 200° C., adding 1% by weight of graphite, molding the mixture into tablets of 6 mm in diameter and 6 mm high and calcining the molded product at 500° C. for 2 hours to obtain Comparative example catalyst 1. The catalyst contained $MoO_3$ in 10% by weight.

COMPARATIVE EXAMPLE 2

Comparative example 1 was repeated except that $MoO_3$ powder was replaced by $V_2O_5$ powder to obtain Comparative example catalyst 2. This catalyst contained $V_2O_5$ in 10% by weight.

COMPARATIVE EXAMPLE 3

Comparative example 1 was repeated except that $MoO_3$ powder (3.3 g) was replaced by $MoO_3$ powder (1.7 g) and $V_2O_5$ powder (1.7 g) to obtain Comparative example catalyst 3. This catalyst contained $MoO_3$ (5% by weight) and $V_2O_5$ (5% by weight).

EXPERIMENTAL EXAMPLE 1

With catalysts of Examples 1-4 and Comparative examples 1-3, accelerated durability tests were carried out using a model gas having simulated a combustion exhaust gas of a coal having a high content of mineral substances. As a catalyst poison, $SO_3$ and $As_2O_3$ as oxidation products of arsenopyrite were added into the gas. The test conditions are shown in Table 1.

TABLE 1

| Item | Conditions |
|---|---|
| Gas composition | |
| NO | 300 ppm |
| $NH_3$ | 360 ppm |
| $SO_2$ | 500 ppm |
| $SO_3$ | 50 ppm |
| $As_2O_3$ | 140 ppm |
| $CO_2$ | 12% |
| $H_2O$ | 12% |
| $O_2$ | 3% |
| $N_2$ | Balance |
| Reaction temperature | 350° C. |
| Space velocity | 120,000h$^{-1}$ |
| Catalyst shape | 10-20 meshes, granular |

The above-mentioned durability tests were carried out for 30 minutes and the catalyst performance was measured before and after the tests. The measurement was carried out employing an atmospheric pressure, flow type, fixed bed reaction apparatus. As the reaction tube, a silica glass tube of 20 mm in inner diameter was used. This reaction tube was heated in an electric oven and the temperature was measured by means of a thermocouple. A catalyst (2 ml) having its particle size adjusted to 10 to 20 meshes was filled in the central part of the reaction tube and the durability tests were carried out under the conditions shown in Table 1. For the analysis of $NO_x$, a $NO_x$ analyzer of chemiluminescence mode was employed and the percentage of $NO_x$ removal was calculated from the following equation:

$$\text{Percentage of } NO_x \text{ removal} = \left(1 - \frac{\text{exit } NO_x \text{ concentration}}{\text{inlet } NO_x \text{ concentration}}\right) \times 100(\%)$$

The results are shown in Table 2. As seen from Table 2, the catalyst of the present invention is hardly deteriorated as compared with Comparative example catalysts.

TABLE 2

| Catalyst | Percentage of $NO_x$ removal (%) | |
|---|---|---|
| | Initial period | After durability test |
| Example 1 | 91 | 54 |
| Example 2 | 77 | 45 |
| Example 3 | 86 | 52 |
| Example 4 | 81 | 47 |
| Comp. ex. 1 | 70 | 33 |
| Comp. ex. 2 | 79 | 21 |
| Comp. ex. 3 | 85 | 37 |

EXAMPLE 5

Example 1 was repeated except that $MoO_3$ powder (14 g) and $V_2O_5$ powder (18 g) were used to prepare Example catalyst 5. This catalyst contained 10% by weight of $MoV_2O_8$ as a composite oxide of molybdenum and vanadium.

EXAMPLES 6-8

In the same manner as in Example 1, $TiO_2$ catalysts containing 10% by weight of $VOMoO_4$, $Mo_4V_6O_{25}$ or $Mo_6V_9O_{40}$ each as a composite oxide of molybdenum and vanadium were prepared to obtain Example catalysts 6, 7 and 8.

EXPERIMENTAL EXAMPLE 2

With Example catalysts 5-8, endurability tests were carried out in the same manner as in Experimental example 1. The results are shown in Table 3.

TABLE 3

| Catalyst | Percentage of $NO_x$ removal (%) | |
|---|---|---|
| | Initial period | After durability test |
| Example 5 | 94 | 47 |
| Example 6 | 90 | 51 |
| Example 7 | 91 | 49 |
| Example 8 | 91 | 50 |

EXAMPLE 9

A catalyst used in the process of the present invention was prepared as follows:
Distilled water (50 ml) was added to $Mn_2O_3$ powder (20 g) and $V_2O_4$ powder (21 g), followed by sufficiently kneading the mixture by means of a mixing and grinding machine for one hour and calcining the resulting slurry at 700° C. for 2 hours. The resulting oxide was examined by X-ray diffraction. As a result, it was in the form of $Mn_2V_2O_7$. A metatitanic acid slurry (the content of the acid in terms of $TiO_2$: 30% by weight) (100 g) was mixed with the above composite oxide (3.3 g), followed by sufficiently kneading the mixture by means of a mixing and grinding machine, drying the resulting material at 200° C., adding 1% by weight of graphite, molding the mixture into pellets of 6 mm in diameter and 6 mm high and calcining the molded product at 500° C. for 2 hours to obtain Example catalyst 9. This catalyst contained 10% by weight of $Mn_2V_2O_7$. In addition, in the performance tests, this molded product was ground into particles having a particle size of 10-20 meshes.

EXAMPLES 10-13

Example 1 was repeated except that the content of $Mn_2V_2O_7$ in Example 9 was varied to 1% by weight, 5% by weight, 20% by weight or 50% by weight to obtain Example catalysts 10, 11, 12 and 13.

COMPARATIVE EXAMPLE 4

A metatitanic acid slurry (100 g) was mixed with $V_2O_5$ powder (3.3 g), followed by kneading the mixture by means of a mixing and grinding machine, drying the resulting material at 200° C., adding 1% by weight of graphite, molding the mixture into tablets of 6 mm in diameter and 6 mm high and calcining the resulting molded product at 500° C. for 2 hours to obtain Comparative example catalyst 4. This catalyst is a $TiO_2$ catalyst containing 10% by weight of $V_2O_5$.

COMPARATIVE EXAMPLE 5

A metatitanic acid slurry (100 g) was mixed with $V_2O_5$ powder (3.8 g) and $Mn_2O_3$ powder (3.8 g), followed by sufficiently kneading the mixture by means of a mixing and grinding machine, drying the resulting material at 200° C., adding 1% by weight of graphite, molding the mixture into tablets of 6 mm in diameter and 6 mm high, and calcining the resulting molded product at 500° C. for 2 hours to obtain Comparative example catalyst 5. This catalyst was a $TiO_2$ catalyst containing 10% by weight of $V_2O_5$ and 10% by weight of $Mn_2O_3$.

EXPERIMENTAL EXAMPLE 3

With catalysts of Examples 9-13 and Comparative examples 4 and 5, durability tests were carried out in the same manner as in Experimental example 1. The results are shown in Table 4.

TABLE 4

| Catalyst | Percentage of $NO_x$ removal (%) | |
|---|---|---|
| | Initial period | After durability test |
| Example 9 | 83 | 54 |
| Example 10 | 75 | 46 |
| Example 11 | 82 | 51 |
| Example 12 | 81 | 53 |
| Example 13 | 76 | 47 |
| Comp. ex. 4 | 77 | 21 |
| Comp. ex. 5 | 79 | 25 |

EXAMPLE 14

Example 9 was repeated except that $Mn_2O_3$ powder (20 g) and $V_2O_3$ powder (9.5 g) were used as starting raw materials in this Example to prepare Example catalyst 14. This catalyst was a TiO$_2$ catalyst containing 10% by weight of Mn$_4$V$_2$O$_9$ as a composite oxide of vanadium and manganese.

EXAMPLE 15

Example 9 was repeated except that MnO powder (20 g) and V$_2$O$_5$ powder (51 g) were used as starting raw materials to prepare Example catalyst 15. This catalyst is a TiO$_2$ catalyst containing 10% by weight of MnV$_2$O$_6$ as a composite oxide of vanadium and manganese.

EXAMPLE 16

Example 9 was repeated except that manganese acetate (20 g) and vanadyl oxalate (16 g) were used as starting raw materials to prepare Example catalyst 16. This catalyst is a TiO$_2$ catalyst containing 10% by weight of MnVO$_3$ as a composite oxide of vanadium and manganese.

EXPERIMENTAL EXAMPLE 4

With catalysts of Examples 14–16, durability tests were carried out in the same manner as in Experimental example 1. The results are shown in Table 5.

TABLE 5

| Catalyst | Percentage of NO$_x$ removal (%) | |
|---|---|---|
| | Initial period | After durability test |
| Example 14 | 81 | 51 |
| Example 15 | 84 | 58 |
| Example 16 | 85 | 57 |

According to the present invention, in the process of removing nitrogen oxides contained in exhaust gases by contacting them with the surface of a catalyst, it is possible to reduce poisoning of the catalyst due to volatile metal compounds contained in exhaust gases and also to treat exhaust gases containing a large quantity of volatile metal compounds such as those of Se, Te, Tl, As, etc., to which conventional denitration catalysts could not have been applied due to their notable deterioration. Further, since the catalyst of the present invention has a small deterioration and a high activity, reduction in the use amount thereof and a long life thereof are possible.

What we claim is:

1. A catalyst for denitration by ammonia-catalytic reduction, comprising titanium oxide and a composite oxide of molybdenum and vanadium expressed by the formula MoV$_x$O$_y$ wherein x represents 0.5 to 3 and y represents 3 to 10.

2. A catalyst for denitration by ammonia-catalytic reduction according to claim 11, wherein said composite oxide of molybdenum and vanadium is at least one compound selected from the group consisting of VOMoO$_4$, Mo$_4$V$_6$O$_{25}$, Mo$_6$V$_9$O$_{40}$ MoV$_2$O$_8$ and MoVO$_5$.

3. A catalyst for denitration by ammonia-catalytic reduction, comprising titanium oxide and a composite oxide of vanadium and manganese expressed by the formula Mn$_a$V$_b$O$_c$ wherein a represents 1 to 4, b represents 1 or 2 and c represents 3 to 9.

4. A catalyst for denitration by ammonia-catalytic reduction according to claim 3, wherein said composite oxide of vanadium and manganese is at least one compound selected from the group consisting of MnVO$_5$, MnV$_2$O$_6$, Mn$_2$V$_2$O$_4$, Mn$_2$V$_2$O$_7$, Mn$_4$V$_2$O$_9$, and Mn$_3$(VO$_4$)$_2$.

5. A catalyst for denitration by ammonia-catalytic reduction according to claim 11, wherein said composite oxide of molybdenum and vanadium comprises 1–50% by weight of the catalyst.

6. A catalyst for denitration by ammonia-catalytic reduction according to claim 5, wherein said composite oxide of molybdenum and vanadium comprises 2–20% by weight of the catalyst.

7. A catalyst for denitration by ammonia-catalytic reduction according to claim 3, wherein said composite oxide of vanadium and manganese comprises 1–50% by weight of the catalyst.

8. A catalyst for denitration by ammonia-catalytic reduction according to claim 7, wherein said composite oxide of vanadium and manganese comprises 2–20% by weight of the catalyst.

* * * * *